United States Patent
Nakanishi (10) Patent No.: US 11,053,822 B2
(45) Date of Patent: Jul. 6, 2021

(54) RECIRCULATION VALVE

(71) Applicant: Nidec Tosok Corporation, Zama (JP)

(72) Inventor: Tomohiko Nakanishi, Zama (JP)

(73) Assignee: NIDEC TOSOK CORPORATION, Kanagawa (JP)

(*) Notice: Subject to any disclaimer, the term of this patent is extended or adjusted under 35 U.S.C. 154(b) by 0 days.

(21) Appl. No.: 16/790,769

(22) Filed: Feb. 14, 2020

(65) Prior Publication Data

US 2020/0300133 A1 Sep. 24, 2020

(30) Foreign Application Priority Data

Mar. 20, 2019 (JP) .............................. JP2019-053454

(51) Int. Cl.
| | |
|---|---|
| *F01M 13/00* | (2006.01) |
| *F16K 15/02* | (2006.01) |
| *F02M 35/10* | (2006.01) |
| *F02M 25/06* | (2016.01) |

(52) U.S. Cl.
CPC ........ *F01M 13/0011* (2013.01); *F02M 25/06* (2013.01); *F02M 35/10222* (2013.01); *F16K 15/025* (2013.01)

(58) Field of Classification Search
CPC .... F01M 13/023; F01M 13/00; F01M 13/021; F01M 2001/1092; F16K 15/026; F16K 17/30; F16K 1/38
See application file for complete search history.

(56) References Cited

U.S. PATENT DOCUMENTS

| | | | |
|---|---|---|---|
| 2013/0105009 A1* | 5/2013 | Oda .................... | F01M 13/0011 137/517 |
| 2015/0107703 A1* | 4/2015 | Yamada .............. | G01M 3/2876 137/551 |
| 2017/0051606 A1* | 2/2017 | Fanini ..................... | E21B 47/10 |
| 2017/0234178 A1* | 8/2017 | Mosher .............. | F01M 13/0011 123/574 |
| 2018/0051606 A1 | 2/2018 | Muramatsu | |
| 2019/0017420 A1* | 1/2019 | Kashiwabara ......... | F01M 13/04 |
| 2019/0085999 A1* | 3/2019 | Chen .................... | F16K 31/0655 |

FOREIGN PATENT DOCUMENTS

| | | | |
|---|---|---|---|
| JP | 2016166571 A | * | 9/2016 |
| JP | 2018-028285 A | | 2/2018 |

OTHER PUBLICATIONS

Google translation of JP2016166571A (Year: 2016).*

* cited by examiner

*Primary Examiner* — Long T Tran
(74) *Attorney, Agent, or Firm* — Keating & Bennett (57) ABSTRACT

A recirculation valve includes a first supported portion that closes a first opening when a valve body biased by a biasing member is moved to one side in the axial direction, the first supported portion opens the first opening when the valve body moves to the other side in the axial direction against a biasing force of the biasing member due to a negative pressure on a downstream side with respect to that on an upstream side, the valve body includes a first hole extending from an end portion on the other side in the axial direction to one side in the axial direction, and a valve body barrel portion includes a second hole that extends from a radially outward side thereof and reaches the first hole.

12 Claims, 11 Drawing Sheets

RECIRCULATION VALVE

CROSS REFERENCE TO RELATED APPLICATION

The present invention claims priority under 35 U.S.C. § 119 to Japanese Application No. 2019-053454 filed on Mar. 20, 2019, the entire contents of which are hereby incorporated herein by reference.

FIELD OF THE INVENTION

The present disclosure relates to a recirculation valve.

BACKGROUND

Conventionally, a recirculation valve that performs recirculation of blow-by gas toward an air intake side in an internal combustion engine is known. This recirculation valve is called a positive crankcase ventilation (PCV) valve and is disposed in a blow-by gas passage that connects a crankcase and an air intake side (for example, an intake manifold). The PCV valve is opened by a negative pressure on the air intake side (an inlet side of blow-by gas that has passed through the PCV valve toward a combustion chamber), thereby recirculating the blow-by gas generated in the crankcase to the air intake side.

Japanese Unexamined Patent Application Publication No. 2018-28285 discloses a mounting structure of a PCV valve in which freezing in the PCV valve is eliminated by heat of blow-by gas. In the PCV valve described in Japanese Unexamined Patent Application Publication No. 2018-28285, a columnar valve body part is housed in a cylindrical valve case, and blow-by gas is recirculated through an opening between an inner circumference of the valve case and an outer circumference of the valve body part.

In an internal combustion engine, it is desired to actively promote recirculation of blow-by gas in response to, for example, automobile exhaust gas regulations. However, in a conventional PCV valve such as the PCV valve described in Japanese Unexamined Patent Application Publication No. 2018-28285, when a negative pressure on an air intake side is large, a flow rate of a recirculating blow-by gas increases in accordance therewith, but when the negative pressure on the air intake side is small, a flow rate of the recirculating blow-by gas is small. In Japanese Unexamined Patent Application Publication No. 2018-28285, although in order to increase a flow rate of the recirculating blow-by gas in a state in which a negative pressure on the air intake side is small, it is conceivable to increase an opening area between the inner circumference of the valve case and the outer circumference of the valve body part, in order to increase the opening area, a diameter of the flow path needs to be extended and thus the entire PCV valve increases in size, thereby causing a problem that a layout of the engine becomes limited.

SUMMARY

According to example embodiments of the present disclosure, recirculation valves are each capable of actively recirculating a large amount of blow-by gas in a state in which a negative pressure on an inlet side is small without an increase in size of the recirculation valve.

A recirculation valve according to an example embodiment of the present disclosure is a disposed in a blow-by gas passage through which blow-by gas of an internal combustion engine is recirculated to an air intake side and the recirculation valve includes a housing including a cylindrical portion in which a through hole penetrating in a direction parallel or substantially parallel to a central axis is provided, a valve body which is movable in an axial direction through the through hole, and a biasing member which biases the valve body to one side in the axial direction of the recirculation valve, in which the cylindrical portion includes a first opening that opens toward one side in the axial direction of the through hole and is connected to an upstream side of the blow-by gas passage, a second opening that opens toward the other side in the axial direction of the through hole and is connected to a downstream side of the blow-by gas passage, a first support portion that supports one side in the axial direction of the valve body on the one side in the axial direction of the through hole, a second support portion that supports the other side in the axial direction of the valve body on the other side in the axial direction of the through hole, and a cylindrical body provided on the other side in the axial direction of the first support portion and on one side in the axial direction of the second support portion, the valve body includes a first supported portion supported by the first support portion, a second supported portion supported by the second support portion, and a valve body barrel portion provided on the other side in the axial direction of the first supported portion and on one side in the axial direction of the second supported portion, the first supported portion closes the first opening when the valve body biased by the biasing member is moved to one side in the axial direction of the recirculation valve, the first supported portion opens the first opening when the valve body moves to the other side in the axial direction of the recirculation valve against a biasing force of the biasing member due to a negative pressure on the downstream side with respect to that on the upstream side, the valve body includes a first hole extending from an end portion on the other side in the axial direction of the recirculation to one side in the axial direction of the recirculation valve, and the valve body barrel portion includes a second hole that extends from a radially outward side thereof and reaches the first hole.

The above and other elements, features, steps, characteristics and advantages of the present disclosure will become more apparent from the following detailed description of the example embodiments with reference to the attached drawings.

DETAILED DESCRIPTION

Hereinafter, positive crankcase ventilation (PCV) valves according to example embodiments of the present disclosure will be described with reference to the drawings. In the following drawings, scales, the number, or the like of respective structures may be made different from those in an actual structure so that respective elements thereof can be more easily understood.

Also, in the drawings, illustration is with an XYZ coordinate system as a three-dimensional orthogonal coordinate system as appropriate. In the XYZ coordinate system, a Z-axis direction is a direction parallel to a central axis J illustrated in FIG. 2. An X-axis direction is a direction in which a cross section of a cross-sectional view illustrated in FIG. 2 extends and a direction perpendicular to the Z-axis direction. A Y-axis direction is a direction perpendicular to the Z-axis direction and the X-axis direction. In any of the X-axis direction, the Y-axis direction, and the Z-axis direction, a side in which an arrow illustrated in the figure faces referred to as a + side, and a side opposite thereto is referred to as a − side.

In the following description, a positive side (+Z side) in the Z-axis direction is referred to as a "rear side," and a negative side (−Z side) in the Z-axis direction is referred to as a "front side." Further, the rear side and the front side are descriptive names used merely for explanation and do not limit actual positional relationships and directions. Unless otherwise specified, a direction parallel to the central axis J (Z-axis direction) will be simply described as an "axial direction," a radial direction with respect to the central axis J will be simply described as a "radial direction," and a circumferential direction with the central axis J as a center, that is, around the axis of the central axis J (θ direction) will be simply described as a "circumferential direction."

In this specification, "extending in the axial direction" includes a case of extending in a direction inclined with respect to the axial direction within a range of less than 45° in addition to a case of extending strictly in the axial direction (Z-axis direction). Also, in this specification, "extending in the radial direction" includes a case of extending in a direction inclined with respect to the radial direction within a range of less than 45° in addition to a case of extending strictly in the radial direction, that is, extending in a direction perpendicular to the axial direction (Z-axis direction).

First Example Embodiment

<Overall Configuration>

Figure 1:
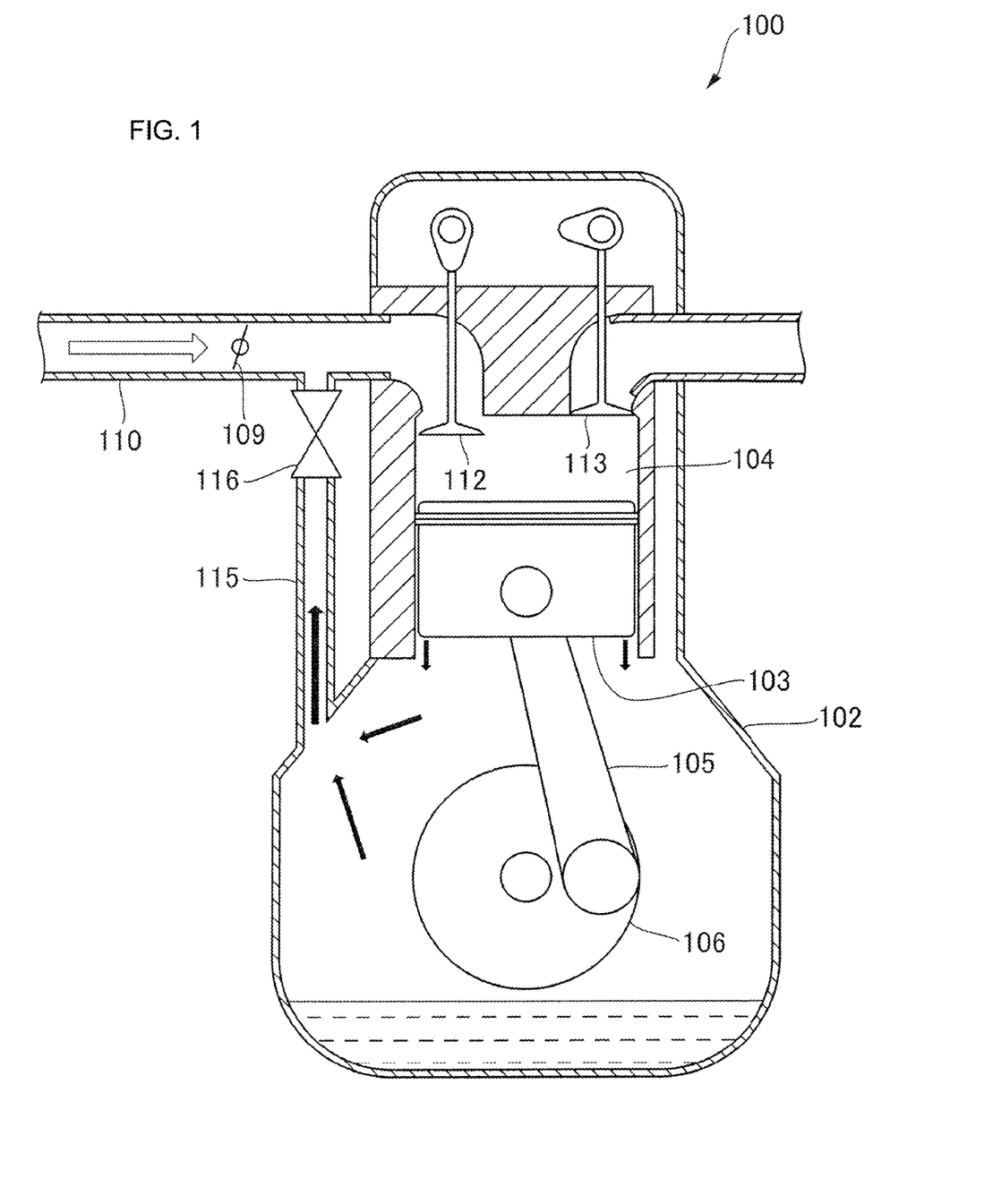
FIG. 1 is a schematic configuration view illustrating a configuration of an internal combustion engine to which a recirculation valve according to a first example embodiment of the present disclosure is applied.

FIG. 1 is a schematic configuration view illustrating a configuration of an internal combustion engine to which a PCV valve according to a first example embodiment of the present disclosure is applied. An internal combustion engine 100 is a multi-cylinder engine including a plurality of sets of pistons 103 and cylinders that house the pistons 103. In each of the sets described above, the cylinder is provided above a crankcase 102 and encloses the piston 103. In FIG. 1, only one cylinder and one piston 103 are illustrated for convenience. The piston 103 moves in a longitudinal direction of the cylinder in the cylinder. In accordance with this movement, a connecting rod 105 connected to the piston 103 rotates a crankshaft 106. A combustion chamber 104 is disposed above the piston 103. A spark plug for igniting fuel is provided in the combustion chamber 104.

An air intake valve 112 is provided at an air intake port of the combustion chamber 104. An exhaust valve 113 is provided at an exhaust port of the combustion chamber 104. Both the air intake valve 112 and the exhaust valve 113 are valves that are opened and closed by a variable valve timing (VVT) mechanism.

An air intake passage 110 is connected to the air intake port of the combustion chamber 104. A throttle valve 109 is disposed in the air intake passage 110. Fresh air taken into the air intake passage 110 is taken into the combustion chamber 104 through the throttle valve 109 and the air intake valve 112 in this order. A gas immediately before being taken into the combustion chamber 104 is mixed with fuel injected from an injector in the air intake passage 110. The fuel that has entered the combustion chamber 104 together with fresh air is ignited by the spark plug. The fuel burned by the ignition is increased in volume by vaporization and moves the piston 103 away from the spark plug.

Gases generated by combustion of the fuel in the combustion chamber 104 are discharged outside as an exhaust gas from the exhaust port of the combustion chamber 104 through the exhaust valve 113 and an exhaust passage.

The internal combustion engine 100 includes a blow-by gas passage 115 that connects the crankcase 102 and a region on a downstream side of the throttle valve 109 in the air intake passage 110. A PCV valve 116 is provided in the blow-by gas passage 115. The PCV valve 116 opens and closes due to a pressure difference between inside the air intake passage 110 and inside the crankcase 102, and recirculates blow-by gas in the crankcase 102 to the air intake passage 110.

<Configuration of PCV Valve 116>

Figure 2:
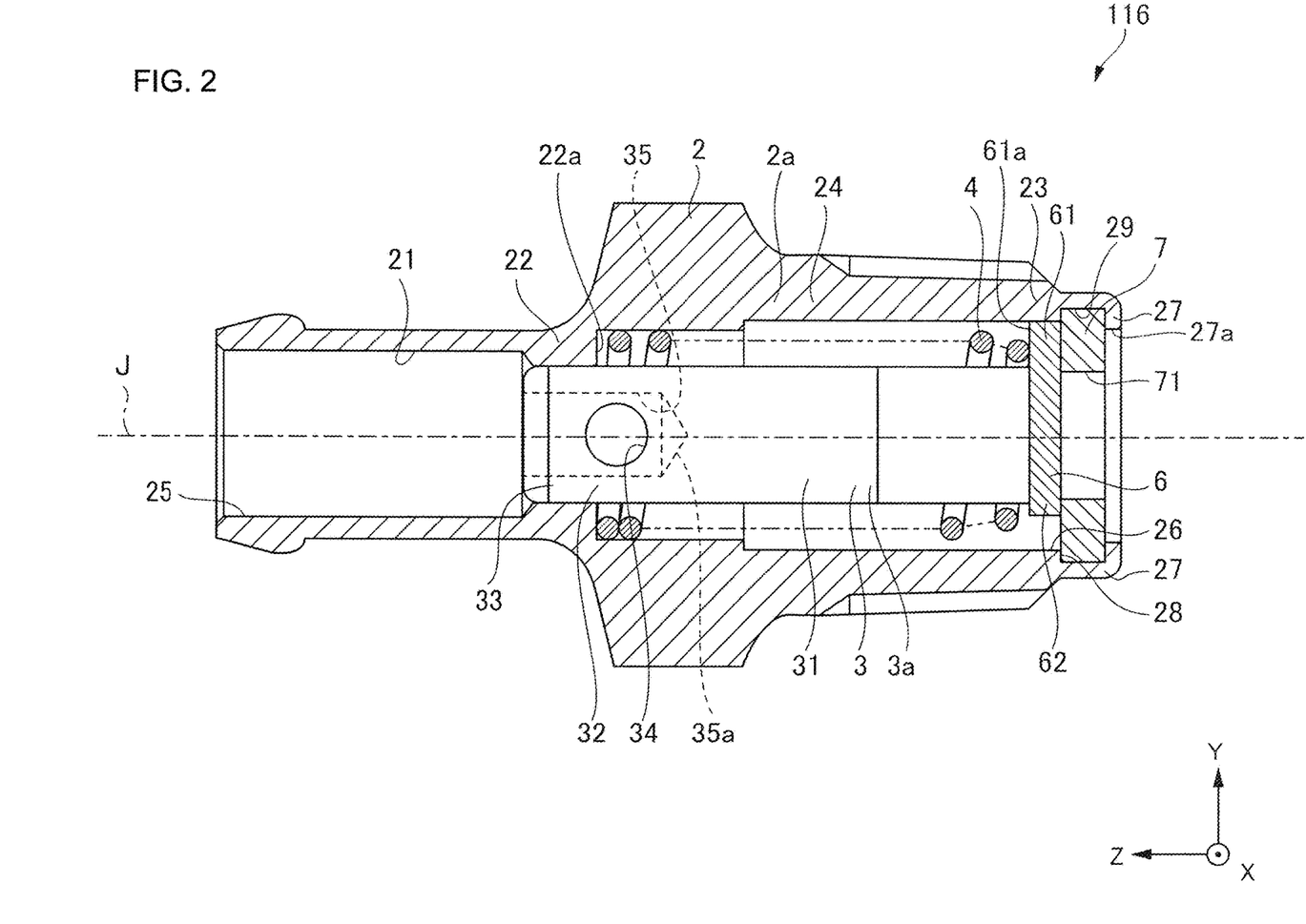
FIG. 2 is a side sectional view of a PCV valve 116 according to the first example embodiment of the present disclosure.
Figure 3:
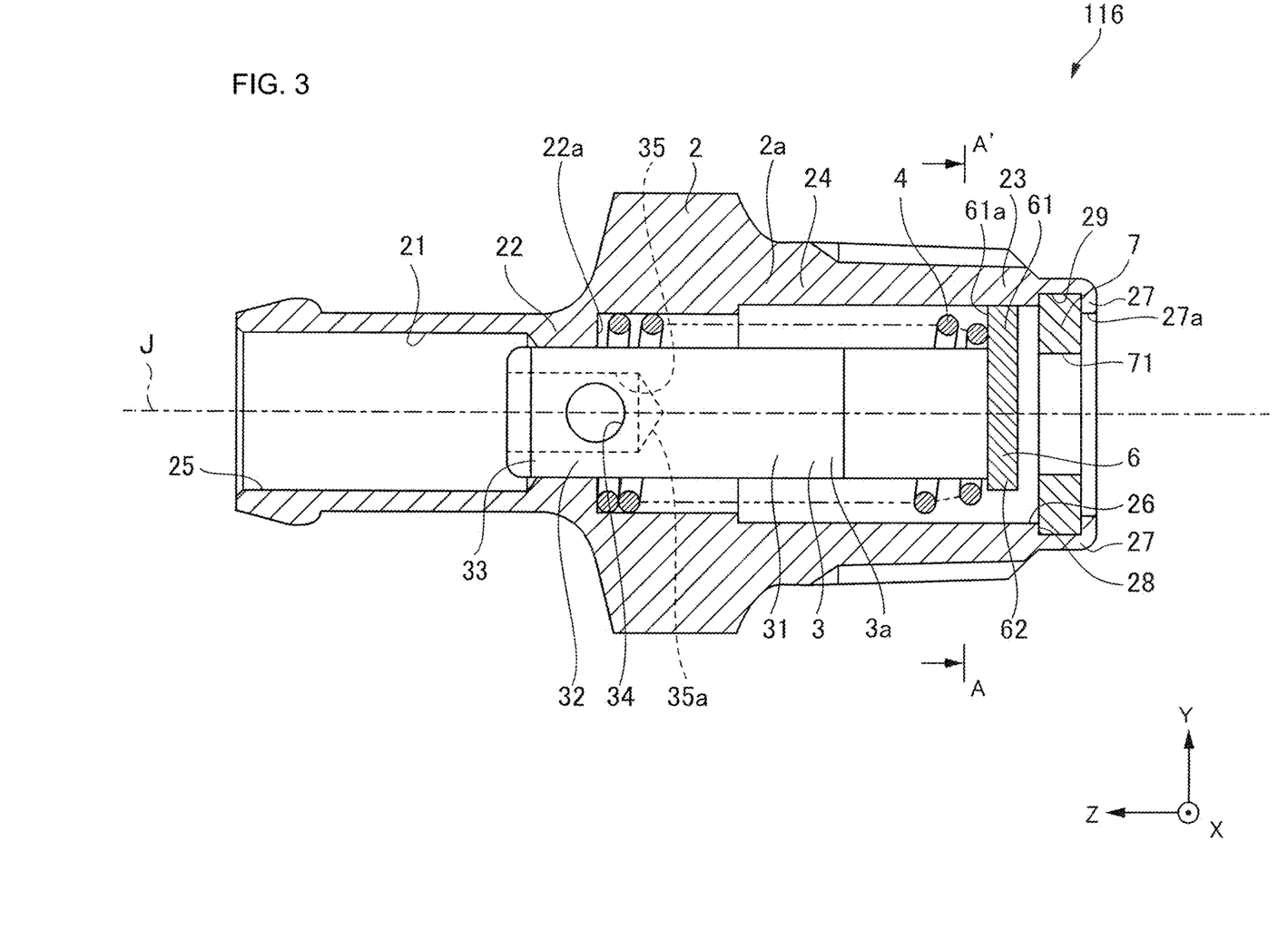
FIG. 3 is a side sectional view of the PCV valve 116 according to the first example embodiment of the present disclosure.

Hereinafter, the PCV valve 116 according to the first example embodiment of the present disclosure will be described. FIGS. 2 and 3 are side cross-sectional views of the PCV valve 116 according to the first example embodiment of the present disclosure. FIG. 2 is a view illustrating a state in which the PCV valve 116 is closed. FIG. 3 is a view illustrating a state in which the PCV valve 116 is open. The PCV valve 116 includes a housing 2 having a cylindrical part 2a in which a through hole 21 penetrating in a direction parallel to the central axis J is provided, a valve body 3 which is movable in the axial direction through the through hole 21, and a biasing member 4 which biases the valve body 3 to one side (−Z side) in the axial direction.

<Housing 2>

The cylindrical part 2a of the housing 2 includes a first opening 71 that opens toward one side in the axial direction of the through hole 21 and is connected to an upstream side (the crankcase 102 side) of the blow-by gas passage 115. The cylindrical part 2a of the housing 2 includes a second opening 25 that opens toward the other side (+Z side) in the axial direction of the through hole 21 and is connected to a downstream side (the air intake passage 110 side) of the blow-by gas passage. The cylindrical part 2a of the housing 2 includes a first support part which supports the valve body 3 on one side in the axial direction of the through hole 21.

The first support part 23 supports the valve body 3 on an inner circumferential surface thereof. The cylindrical part 2a of the housing 2 includes a second support part 22 which supports the valve body 3 on the other side in the axial direction of the through hole 21. The second support part 22 supports the valve body 3 on an inner circumferential surface thereof. The cylindrical part 2a of the housing 2 includes a cylindrical body part 24 provided on the other side in the axial direction of the first support part 23 and on one side in the axial direction of the second support part 22. An inner circumference of the second support part 22 has a smaller diameter than an inner circumference of the cylindrical body part 24. The second support part 22 has a second stepped surface 22a that extends radially inward and faces one side in the axial direction at a boundary with the cylindrical body part 24. The cylindrical part 2a of the housing 2 includes an end portion 27 on one side in the axial direction. An inner circumferential surface of the end portion 27 has a larger diameter than an inner circumferential surface 26 of the cylindrical body part 24. The cylindrical body part 24 includes a stepped surface 28 that extends radially inward and faces one side in the axial direction at a boundary with the end portion 27.

<Valve Seat Member 7>

The housing 2 includes the valve seat member 7. The valve seat member 7 is a member having an annular shape. An inner circumference of the valve seat member 7 has a smaller diameter than an outer circumference of a flange member 6. The inner circumference of the valve seat member 7 forms the first opening 71. An outer circumference of the valve seat member 7 has a larger diameter than the inner circumferential surface 26 of the cylindrical body part 24. The valve seat member 7 is housed radially inward from the end portion 27. In the valve seat member 7 housed in the end portion 27, a surface thereof facing the other side in the axial direction is in contact with the stepped surface 28. The end portion 27, with the valve seat member 7 housed therein, has a distal end on one side in the axial direction bent radially inward. The valve seat member 7 housed in the end portion 27 has a surface facing one side in the axial direction that is in contact with the distal end on one side in the axial direction of the end portion 27 bent radially inward. An inner circumference of the distal end on one side in the axial direction of the end portion 27 bent radially inward forms an opening 27a. The inner circumference of the distal end on one side in the axial direction of the end portion 27 bent radially inward has a larger diameter than the inner circumference of the valve seat member 7. The inner circumference of the distal end on one side in the axial direction of the end portion 27 bent radially inward has a smaller diameter than the outer circumference of the valve seat member 7.

<Valve Body 3>

The valve body 3 includes a columnar member 3a and the flange member 6. In the present example embodiment, the columnar member 3a is a separate member from the flange member 6. By being separate members, each of the members can be made without needing complicated processing, and a manufacturing process thereof can be simplified. The columnar member 3a and the flange member 6 may be formed as one member. The flange member 6 is a first supported part supported by the first support part 23. The columnar member 3a includes a valve body barrel part 31 provided on the other side in the axial direction of the flange member 6. The columnar member 3a includes a second supported part 32 provided on the other side in the axial direction of the valve body barrel part 31.

The flange member 6 is press-fitted and fixed to an end portion on one side in the axial direction of the valve body barrel part 31. A shape of the flange member 6 when viewed from the axial direction will be described below with reference to FIG. 4. The flange member 6 includes a first stepped surface 61a that extends radially outward and faces the other side in the axial direction at a boundary with the valve body barrel part 31.

<Biasing Member 4>

In the present example embodiment, the biasing member 4 is a coil spring. The biasing member 4 may be a member other than a coil spring such as a leaf spring. An end portion on one side in the axial direction of the biasing member 4 is in contact with the first stepped surface 61a. An end portion on the other side in the axial direction of the biasing member 4 is in contact with the second stepped surface 22a. The biasing member 4 is housed between the inner circumference of the cylindrical body part 24 and an outer circumference of the valve body barrel part 31. The flange member 6 receives a biasing force of the biasing member 4 on the first stepped surface 61a and is moved to one side in the axial direction to close the first opening 71 (see FIG. 2). Thereby, the valve body 3 serving as a valve closes the first opening 71 of the valve seat member 7 serving as a valve seat, and thereby the PCV valve 116 is closed. The flange member 6 moves to the other side in the axial direction against the biasing force of the biasing member 4 due to a negative pressure on the second opening 25 side with respect to the first opening 71 side (see FIG. 3). Thereby, the valve body 3 serving as a valve opens the first opening 71 of the valve seat member 7 serving as a valve seat, and thereby the PCV valve 116 is opened.

<Columnar Member 3a>

The columnar member 3a includes a first hole 35 that extends from an end portion on the other side in the axial direction to one side in the axial direction. The columnar member 3a includes a second hole 34 that extends from a radially outward side (an outer circumferential surface of the columnar member 3a) and reaches the first hole 35. In the present example embodiment, the columnar member 3a is coaxial with the central axis J. In the present example embodiment, the first hole 35 is coaxial with the central axis J. A direction in which the first hole 35 extends is parallel to the axial direction. Since the first hole 35 is parallel to the axial direction, the columnar member 3a can be easily processed compared to other cases. A bottom portion 35a, which is an end portion on one side in the axial direction of the first hole 35, has a conical shape in which a depth of the first hole 35 increases as it goes radially inward. A cross-sectional shape of the second hole 34 is circular. Since the cross-sectional shape of the second hole 34 is circular, the columnar member 3a can be easily processed compared to other cases. Also, since the shape of the second hole 34 on the outer circumferential surface of the columnar member 3a is circular, when the valve body 3 moves in the axial direction, it can be made difficult for an end portion on the radially inward side of the second stepped surface 22a and the second hole 34 on the outer circumferential surface of the columnar member 3a to interfere with each other, and thus the valve body 3 can smoothly move in the axial direction. A direction in which the second hole 34 extends is the radial direction. The direction in which the second hole 34 extends is a direction perpendicular to the axial direction. Since the second hole 34 is perpendicular to the axial direction, the columnar member 3a can be easily processed compared to other cases. The second supported part 32 includes, on an outer circumference thereof, a second contact part 33 in which an end portion on a radially outward side is in contact with the second support part 22 and a second hole 34 serving as a second spacing part in which an end portion on the radially outward side is spaced apart from the second support part 22.

<Flange Member 6>

Figure 4:
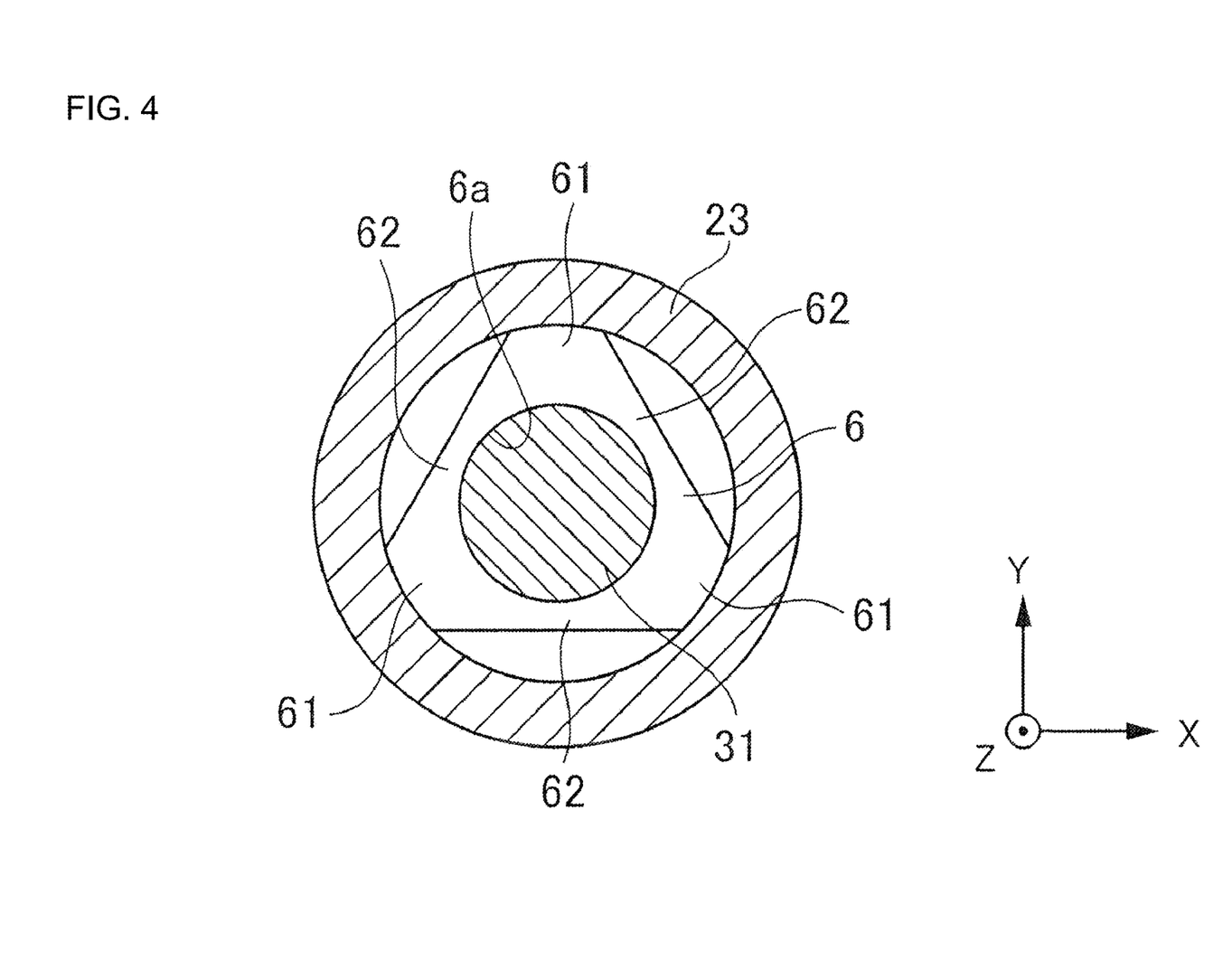
FIG. 4 is a cross-sectional view taken along line A-A' of FIG. 3.

FIG. 4 is a cross-sectional view taken along line A-A' of FIG. 3. The flange member 6 is a plate-shaped member having a shape in which a first contact part 61 in which an end portion on a radially outward side is in contact with the first support part 23 and a first spacing part 62 in which an end portion on a radially outward side is spaced apart from the first support part 23 are alternately disposed in the circumferential direction. In the present example embodiment, the flange member 6 includes three first contact parts 61 and three first spacing parts 62 disposed in the circumferential direction. The end portion on the radially outward side of the first contact part 61 is positioned on a radially outward side of an end portion on a radially outward side of the valve body barrel part 31. The flange member 6 has a through hole 6a penetrating in the axial direction. When the valve body barrel part 31 is press-fitted into the through hole 6a, the flange member 6 is fixed to the columnar member 3a. According to the present example embodiment, a size of a flow path formed between the first contact part 61 and the first spacing part 62 is constant regardless of a position in the axial direction of the valve body 3, and thereby a flow rate of the recirculating blow-by gas can be secured. According to the present example embodiment, since the valve body 3 is supported at three points (three contact points between the first contact parts 61 and the first support part 23) in the first support part 23, the valve body 3 can be stably supported and a flow rate of the recirculating blow-by gas can be secured.

Figure 5:
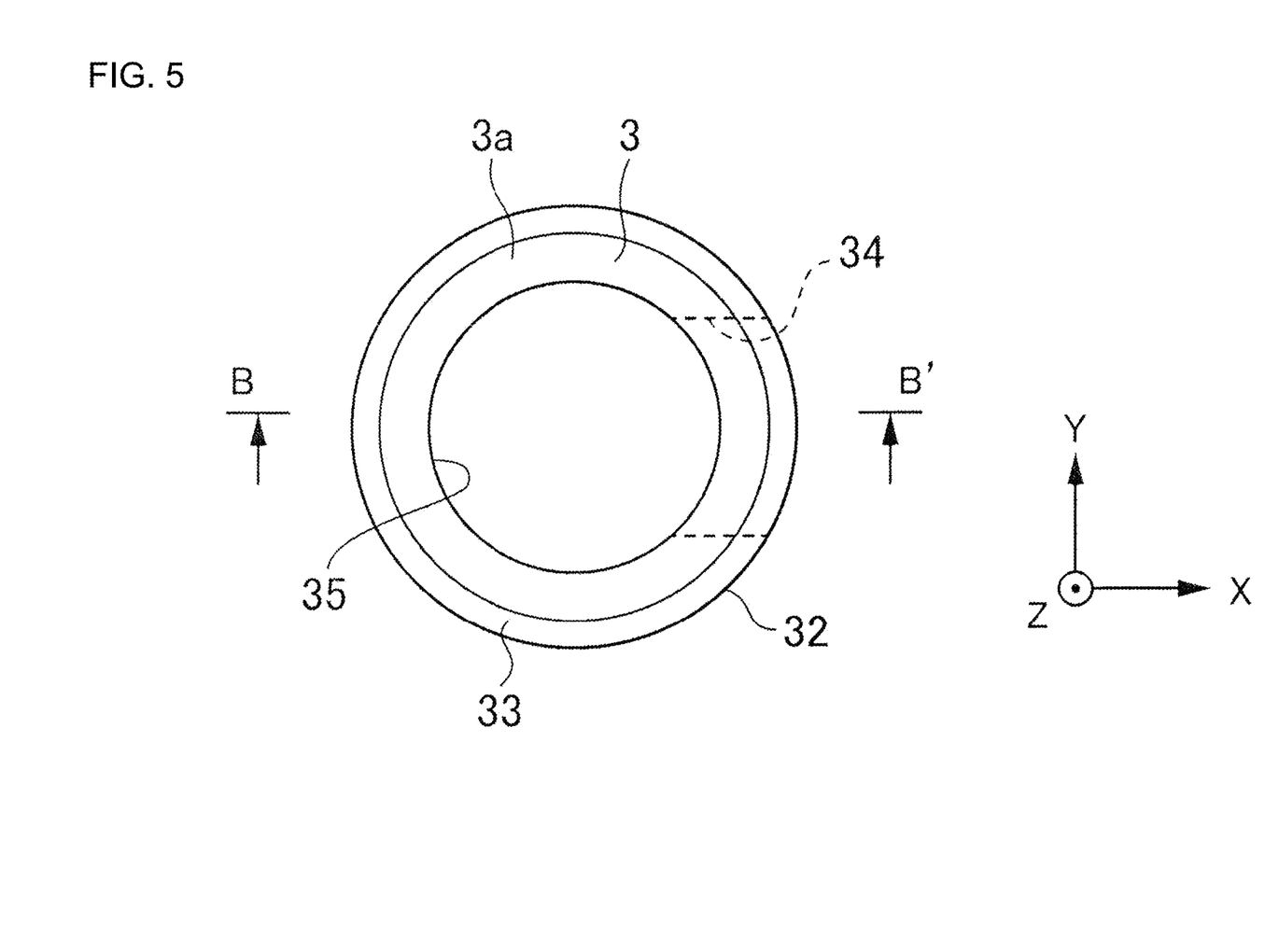
FIG. 5 is a side view of a valve body 3 of FIG. 3 from the other side in an axial direction.
Figure 6:
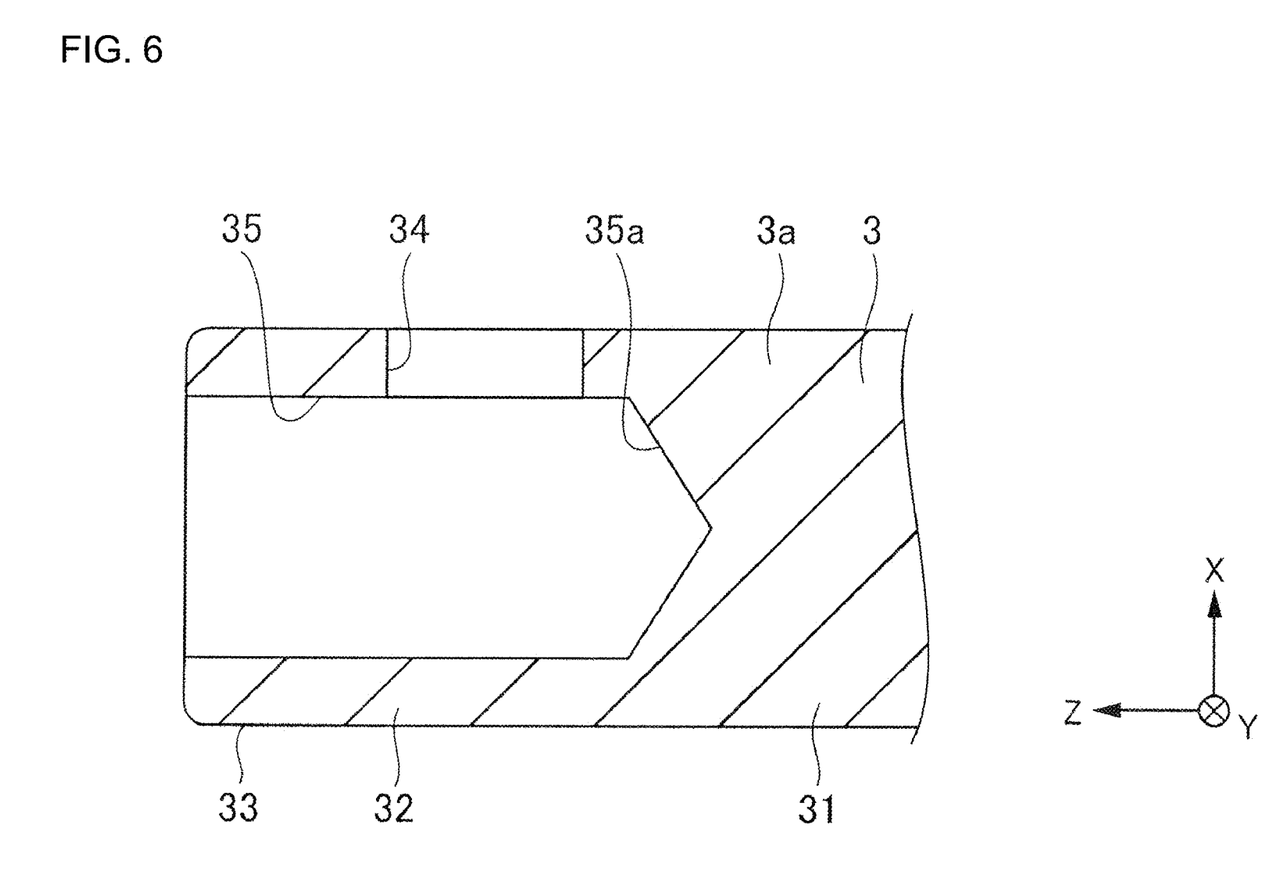
FIG. 6 is a cross-sectional view taken along line B-B' of FIG. 5.

FIG. 5 is a side view of the valve body 3 of FIG. 3 when viewed from the other side in the axial direction. FIG. 6 is a cross-sectional view taken along line B-B' of FIG. 5. The second hole 34 extends in the radial direction from an outer circumferential surface of the second supported part 32 toward the first hole 35. The second hole 34 opens with respect to the first hole 35. A hole diameter of the first hole 35 and a hole diameter of the second hole 34 may be determined according to a flow rate of the blow-by gas that is caused to flow therethrough. The hole diameter of the first hole 35 is larger than the hole diameter of the second hole 34. The hole diameter of the first hole 35 may be the same as the hole diameter of the second hole 34. The hole diameter of the first hole 35 may be smaller than the hole diameter of the second hole 34.

<Operation of PCV Valve 116>

When a force that moves the valve body 3 to the other side in the axial direction due to a negative pressure on the second opening 25 side with respect to the first opening 71 side is smaller than a biasing force of the biasing member 4, the flange member 6 comes into contact with the valve seat member 7 to close the first opening 71, and thereby the PCV valve 116 is closed. When the force that moves the valve body 3 to the other side in the axial direction due to a negative pressure on the second opening 25 side with respect to the first opening 71 side is larger than a biasing force of the biasing member 4, the flange member 6 moves away from the valve seat member 7 to open the first opening 71, and thereby the PCV valve 116 is opened. At this time, a flow path of the blow-by gas is formed between the first opening 71, the first support part 23, and the first spacing part 62, between the cylindrical body part 24 and the valve body barrel part 31, and by the second hole 34, the first hole 35, and the second opening 25.

According to the present example embodiment, since the flow path is formed by the second hole 34 and the first hole 35, a recirculation valve capable of actively recirculating a large amount of blow-by gas in a state in which a negative pressure on an inlet side is small without an increase in size of the recirculation valve can be provided.

Figure 7:
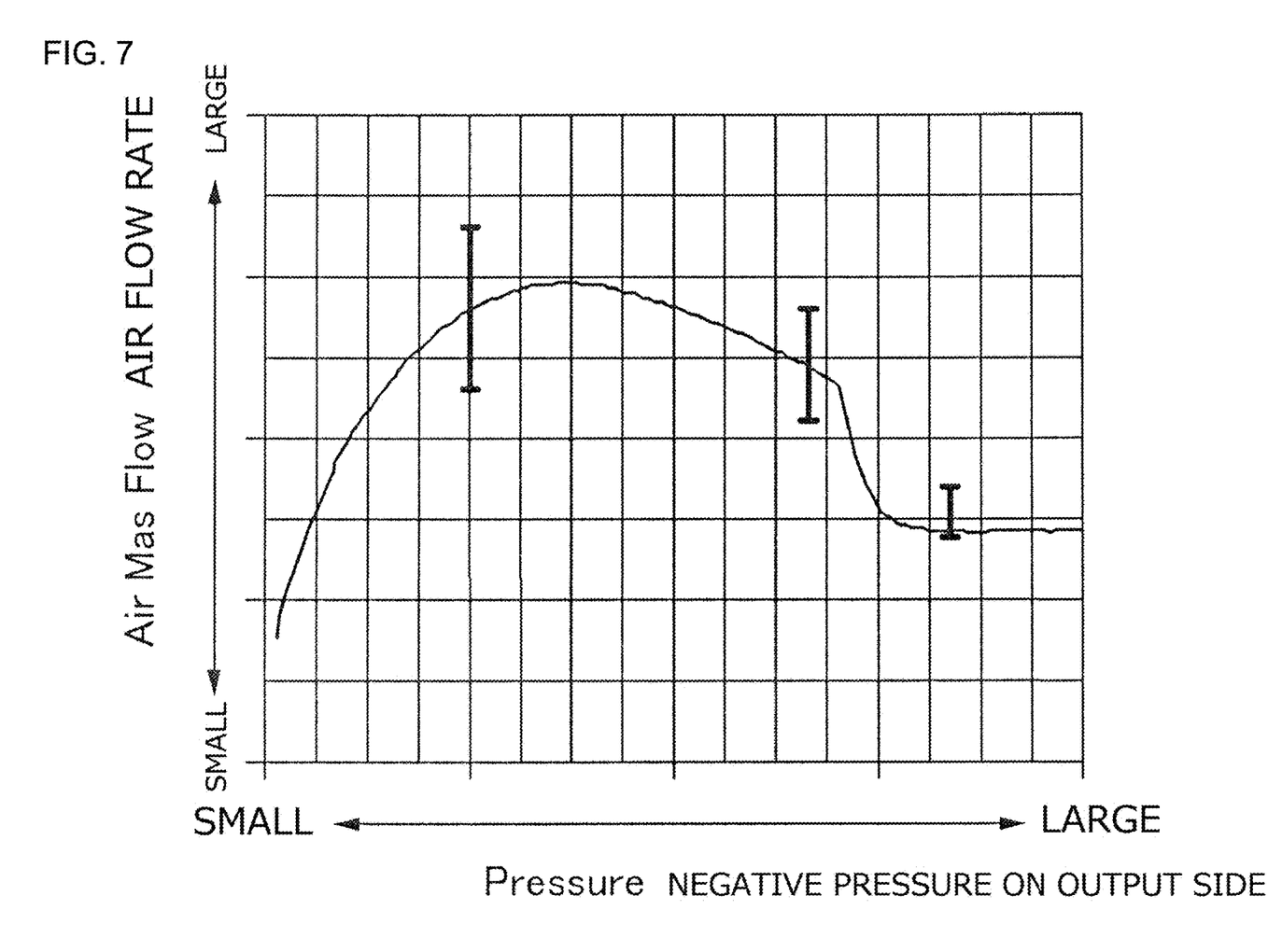
FIG. 7 is a view showing operating characteristics of a conventional PCV valve.
Figure 8:
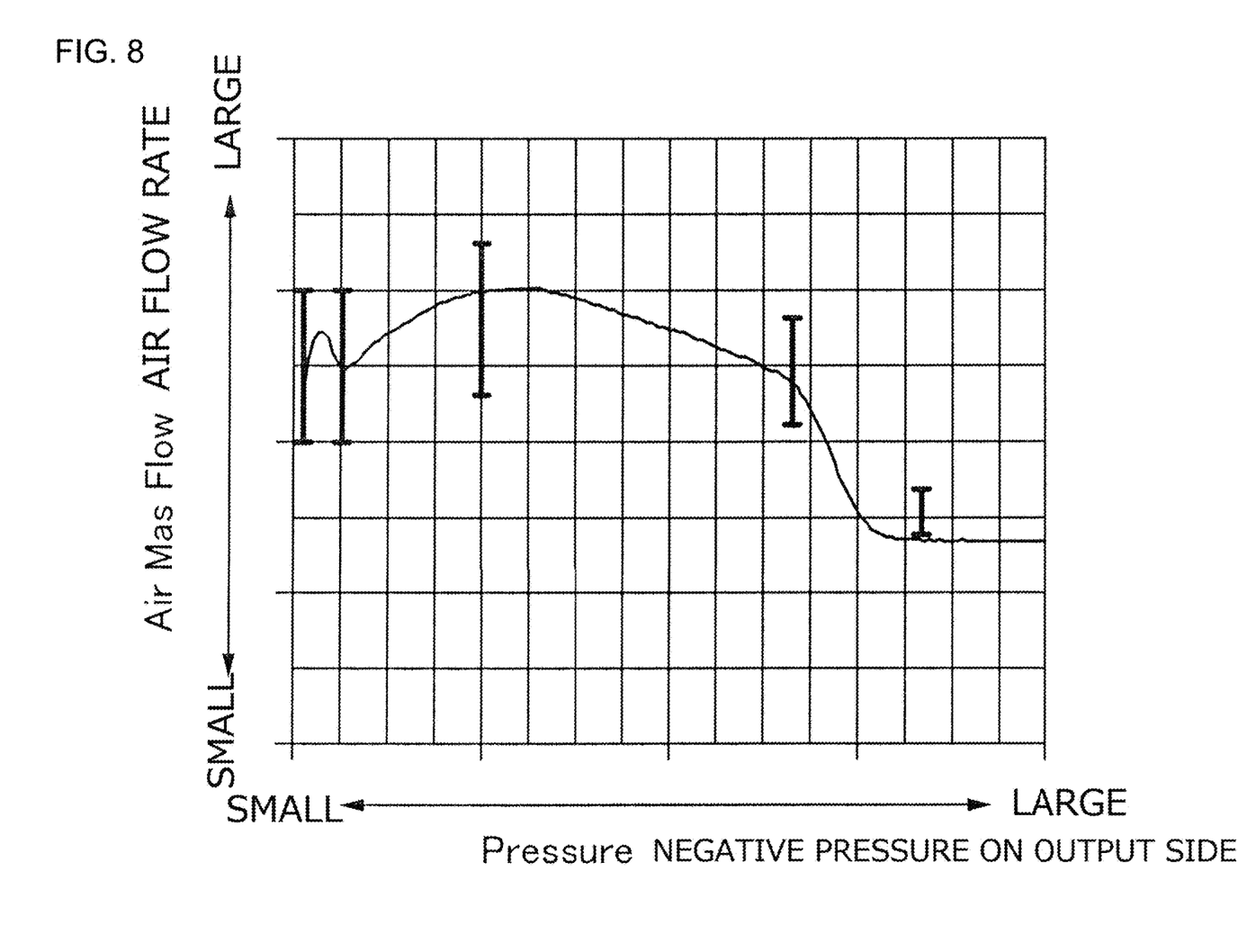
FIG. 8 is a view showing operating characteristics of the PCV valve 116 of an example embodiment of the present disclosure.

FIG. 7 is a view showing operating characteristics of a conventional PCV valve. FIG. 8 is a view showing operating characteristics of the PCV valve 116 of the present example embodiment. In FIGS. 7 and 8, a horizontal axis represents a negative pressure (a negative pressure on an output side) on an air intake side (an inlet side of the blow-by gas that has passed through the PCV valve toward the combustion chamber), and a vertical axis represents a flow rate of the blow-by gas flowing through the PCV valve. In the conventional PCV valve shown in FIG. 7, for example, in a case of a region in which a negative pressure on an air intake side is small, a sufficient flow rate of the blow-by gas has not been secured. In contrast, in the PCV valve 116 of the present example embodiment, as shown in FIG. 8, for example, even in a case of a region in which a negative pressure on the air intake side is small, a sufficient flow rate of the blow-by gas is secured. Therefore, according to the PCV valve 116 of the present example embodiment, for example, even in a low rotation range of the internal combustion engine 100, recirculation of the blow-by gas is promoted.

Second Example Embodiment

In a second example embodiment of the present disclosure, constituents of an internal combustion engine are the same as those in the first example embodiment, and thus description of an overall configuration including the internal combustion engine will be omitted.

<PCV Valve 116>

A PCV valve 116 according to the second example embodiment of the present disclosure will be described below. In the present example embodiment, a difference from the first example embodiment is a hole that extends from an outer circumferential surface of a columnar member 3a and reaches a first hole 35, and other points are the same as those in the first example embodiment, and thus detailed description thereof will be omitted.

<Columnar Member 3a>

Figure 9:
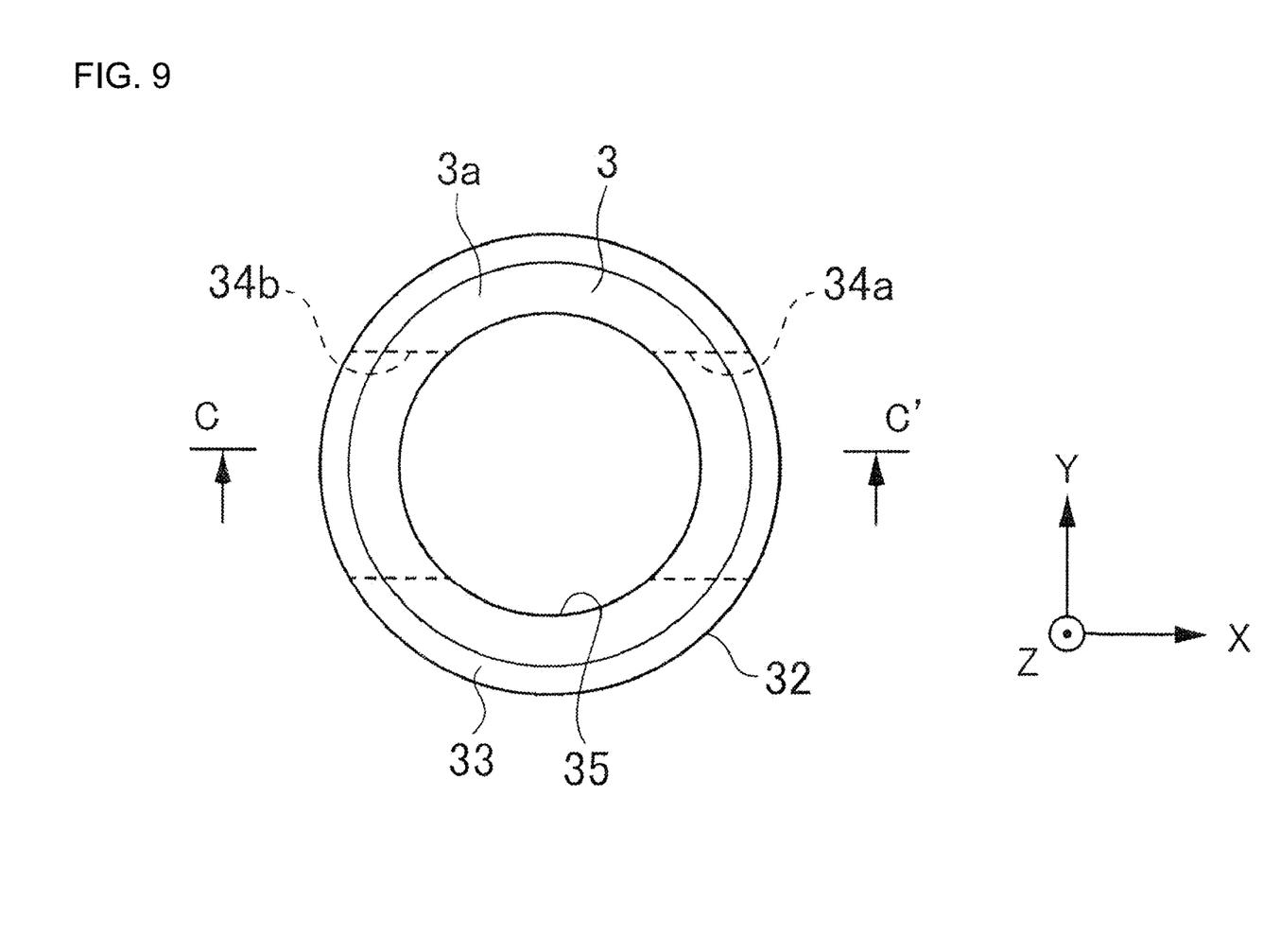
FIG. 9 is a side view of the valve body 3 of FIG. 3 from the other side in the axial direction in a second example embodiment of the present disclosure.
Figure 10:
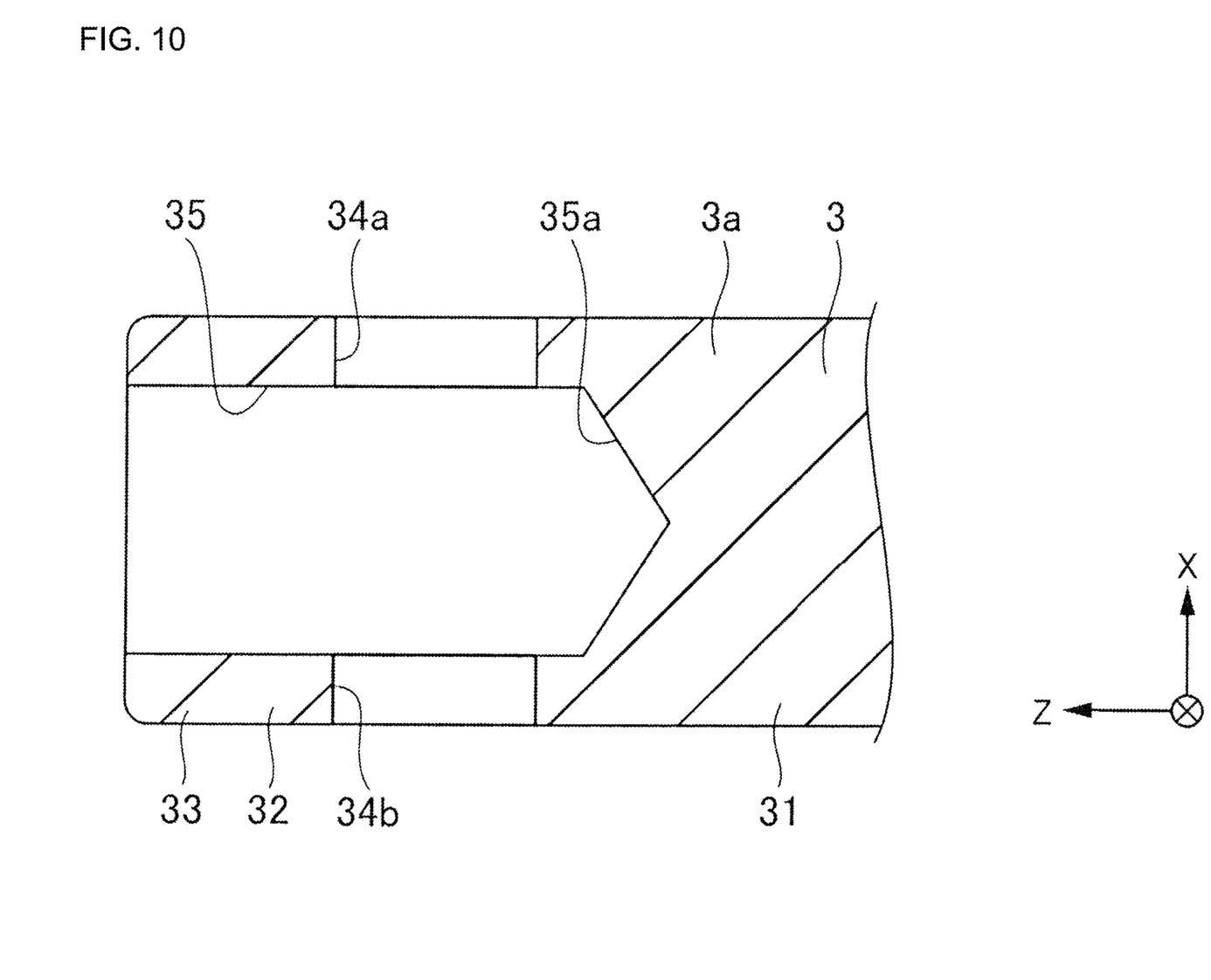
FIG. 10 is a cross-sectional view taken along line C-C' of FIG. 9.

FIG. 9 is a side view of the valve body 3 of FIG. 3 from the other side in the axial direction in the second example embodiment. FIG. 10 is a cross-sectional view taken along line C-C' of FIG. 9. In the present example embodiment, a second hole 34a and a second hole 34b are provided. Each of the second hole 34a and the second hole 34b extends in a radial direction from the outer circumferential surface of the columnar member 3a toward the first hole 35. Each of the second hole 34a and the second hole 34b opens with respect to the first hole 35. The second hole 34a is coaxial with the second hole 34b. Therefore, the second hole 34a and the second hole 34b penetrate through the columnar member 3a in the radial direction. According to the present example embodiment, since the second holes 34a and 34b penetrate through the columnar member 3a, a manufacturing process can be simplified compared to a case in which a hole extending from the outer circumferential surface of the columnar member 3a and reaching the first hole 35 stops in the middle of the columnar member 3a. In the present example embodiment, the second hole 34a and the second hole 34b penetrate through the valve body barrel part 31 in the radial direction. The second hole 34a and the second hole 34b may penetrate through a second supported part 32 in the radial direction. A hole diameter of the first hole 35, a hole diameter of the second hole 34a, and a hole diameter of the second hole 34b may be determined according to a flow rate of blow-by gas that is caused to flow therethrough. The hole diameter of the second hole 34a is equal to the hole diameter of the second hole 34b. The hole diameter of the second hole 34a may be different from the hole diameter of the second hole 34b. The second hole 34a may not be coaxial with the second hole 34b.

Third Example Embodiment

In a third example embodiment of the present disclosure, constituents of an internal combustion engine are the same as those in the first example embodiment, and thus description of an overall configuration including the internal combustion engine will be omitted.

<PCV Valve 116>

Hereinafter, a PCV valve 116 according to the third example embodiment of the present v will be described. In the present example embodiment, a difference from the first example embodiment is a hole that extends from an outer circumferential surface of a columnar member 3a and reaches a first hole 35, and other points are the same as those in the first example embodiment, and thus detailed description thereof will be omitted.

<Columnar Member 3a>

Figure 11:
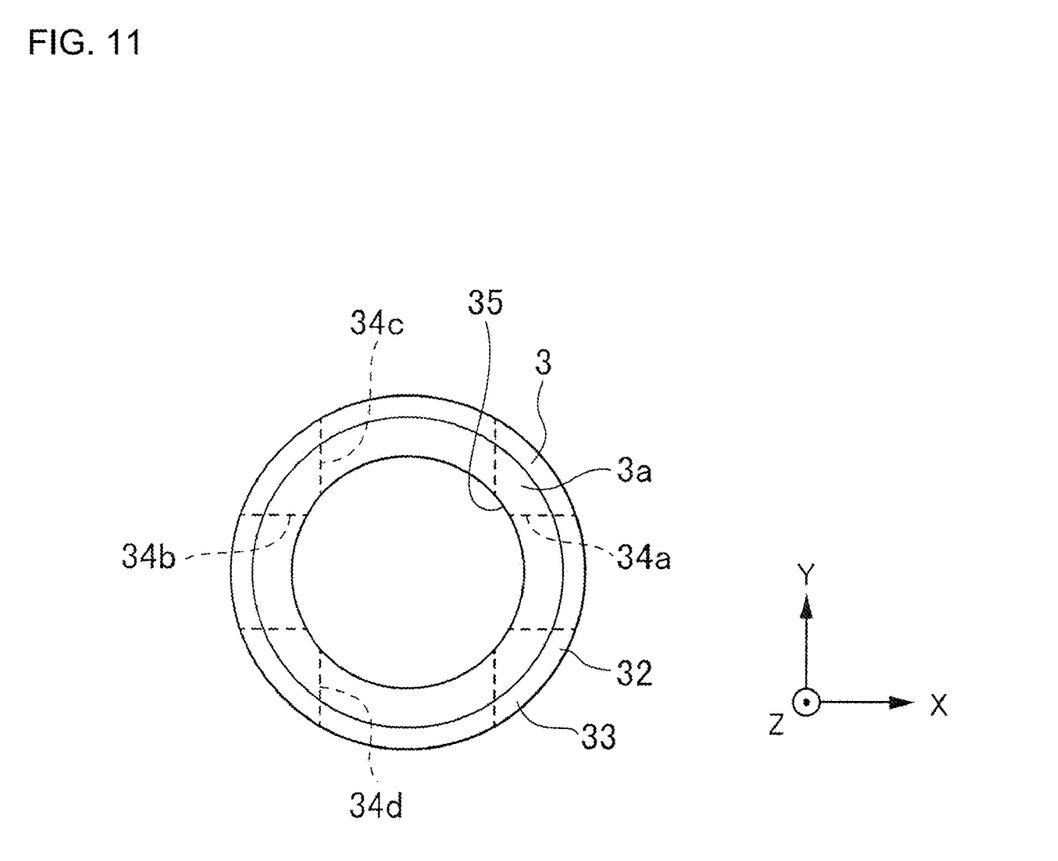
FIG. 11 is a side view of the valve body 3 of FIG. 3 from the other side in the axial direction in a third example embodiment of the present disclosure.

FIG. 11 is a side view of the valve body 3 of FIG. 3 from the other side in the axial direction in the third example embodiment. In the present example embodiment, a second hole 34a, a second hole 34b, a second hole 34c, and a second hole 34d are provided. The columnar member 3a has a plurality of holes including the second hole 34a, the second hole 34b, the second hole 34c, and the second hole 34d in a circumferential direction. A valve body barrel part 31 may have a plurality of holes including the second hole 34a, the second hole 34b, the second hole 34c, and the second hole 34d in the circumferential direction. A second supported part 32 may have a plurality of holes including the second hole 34a, the second hole 34b, the second hole 34c, and the second hole 34d in the circumferential direction. According to the present example embodiment, since the plurality of holes including the second hole 34a, the second hole 34b, the second hole 34c, and the second hole 34d are provided in the circumferential direction, an opening area can be secured compared to a case of having a single hole, and a flow rate of a recirculating blow-by gas can be secured.

Each of the second hole 34a, the second hole 34b, the second hole 34c, and the second hole 34d extends in a radial direction from the outer circumferential surface of the columnar member 3a toward the first hole 35. Each of the second hole 34a, the second hole 34b, the second hole 34c, and the second hole 34d opens with respect to the first hole 35. The second hole 34a is coaxial with the second hole 34b. Therefore, the second hole 34a and the second hole 34b penetrate through the columnar member 3a in the radial direction. The second hole 34c is coaxial with the second hole 34d. Therefore, the second hole 34c and the second hole 34d penetrate through the columnar member 3a in the radial direction. A direction in which the second hole 34a and the second hole 34b extend is perpendicular to a direction in which the second hole 34c and the second hole 34d extend. The direction in which the second hole 34a and the second hole 34b extend may not be perpendicular to the direction in which the second hole 34c and the second hole 34d extend. A hole diameter of the first hole 35, a hole diameter of the second hole 34a, a hole diameter of the second hole 34b, a hole diameter of the second hole 34c, and a hole diameter of the second hole 34d may be determined according to a flow rate of the blow-by gas that is caused to flow therethrough. The hole diameter of the second hole 34a, the hole diameter of the second hole 34b, the hole diameter of the second hole 34c, and the hole diameter of the second hole 34d are all the same. The hole diameter of the second hole 34a, the hole diameter of the second hole 34b, the hole diameter of the second hole 34c, and the hole diameter of the second hole 34d may be different from each other. The second hole 34a may not be coaxial with the second hole 34b. The second hole 34c may not be coaxial with the second hole 34d.

Applications of the PCV valve of the above-described example embodiment are not particularly limited. The PCV valve of the above-described example embodiments may be mounted, for example, on a vehicle. Also, each of the above-described configurations of each example embodiment can be appropriately combined within a range in which they are not inconsistent with each other.

While the present disclosure has been described with reference to exemplary example embodiments, it is to be understood that the disclosure is not limited to the disclosed example embodiments. The scope of the following claims is to be accorded the broadest interpretation so as to encompass all such modifications and equivalent structures and functions.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A recirculation valve disposed in a blow-by gas passage through which blow-by gas of an internal combustion engine is recirculated to an air intake side, the recirculation valve comprising:
   a housing including a cylindrical portion in which a through hole penetrating in a direction parallel or substantially parallel to a central axis is provided;
   a valve body that is movable in an axial direction through the through hole; and
   a biasing member that biases the valve body to one side in the axial direction of the recirculation valve; wherein
   the cylindrical portion includes:
   a first opening that opens toward one side in the axial direction of the through hole and is connected to an upstream side of the blow-by gas passage;
   a second opening that opens toward the other side in the axial direction of the through hole and is connected to a downstream side of the blow-by gas passage;
   a first support portion that supports the valve body on one side in the axial direction of the valve body and that is on the one side in the axial direction of the through hole;
   a second support portion that supports the valve body the other side in the axial direction of the valve body and that is on the other side in the axial direction of the through hole; and
   a cylindrical body portion provided on the other side in the axial direction of the first support portion and on one side in the axial direction of the second support portion;
   the valve body includes:
   a first supported portion supported by the first support portion;

a second supported portion supported by the second support portion; and a valve body barrel portion provided on the other side in the axial direction of the first supported portion and on one side in the axial direction of the second supported portion;

the first supported portion closes the first opening when the valve body biased by the biasing member is moved to one side in the axial direction of the recirculation valve;

the first supported portion opens the first opening when the valve body moves to the other side in the axial direction of the recirculation valve against a biasing force of the biasing member due to a negative pressure on the downstream side with respect to that on the upstream side;

the valve body includes a first hole extending from an end portion on the other side in the axial direction of the recirculation valve to one side in the axial direction of the recirculation valve; and the valve body barrel portion includes a second hole that extends from a radially outward side thereof and reaches the first hole.

2. The recirculation valve according to claim 1, wherein the second hole penetrates through the valve body barrel portion in the radial direction.

3. The recirculation valve according to claim 2, wherein the valve body barrel portion includes a plurality of second holes in a circumferential direction.

4. The recirculation valve according to claim 3, wherein a direction in which the second hole extends is a direction perpendicular or substantially perpendicular to the axial direction.

5. The recirculation valve according to claim 2, wherein a direction in which the second hole extends is a direction perpendicular or substantially perpendicular to the axial direction.

6. The recirculation valve according to claim 2, wherein a direction in which the first hole extends is a direction parallel or substantially parallel to the axial direction.

7. The recirculation valve according to claim 2, wherein a cross-sectional shape of the second hole is circular or substantially circular.

8. The recirculation valve according to claim 1, wherein the valve body barrel portion includes a plurality of second holes in a circumferential direction.

9. The recirculation valve according to claim 3, wherein a direction in which the second hole extends is a direction perpendicular or substantially perpendicular to the axial direction.

10. The recirculation valve according to claim 1, wherein a direction in which the second hole extends is a direction perpendicular or substantially perpendicular to the axial direction.

11. The recirculation valve according to claim 1, wherein a direction in which the first hole extends is a direction parallel or substantially parallel to the axial direction.

12. The recirculation valve according to claim 1, wherein a cross-sectional shape of the second hole is circular or substantially circular.

* * * * *